Patented Feb. 19, 1924.

1,484,018

UNITED STATES PATENT OFFICE.

HENRY A. GARDNER, OF WASHINGTON, DISTRICT OF COLUMBIA.

OBTAINING PRODUCTS FROM CHLORINATED HYDROCARBONS.

No Drawing.   Application filed June 30, 1920.  Serial No. 393,091.

*To all whom it may concern:*

Be it known that I, HENRY A. GARDNER, a citizen of the United States, residing at Washington, in the District of Columbia, have invented certain new and useful Improvements in Obtaining Products from Chlorinated Hydrocarbons, of which the following is a specification.

It is known that unsaturated bodies of a resinous or oily character and dark color may be prepared from mineral oils or distillates therefrom, by a process involving the chlorination of the oil and the subsequent elimination of a part of the combined chlorin. In such processes, as heretofore described, the temperature required during the so-called dechlorinating step has been very high, approximating 300° C. (compare for example British Patent 23,376 of 1914), with the result that irrespective of the color of the original oil, or of the chlorinated oil, the final products were very dark or even almost black in color. Moreover the hydrochloric acid evolved was contaminated by organic distillation or decomposition products derived from the oil at these high operating temperatures.

In a copending application Serial Number 343,459, filed December 9, 1919, Gardner and Bielouss, certain methods are described whereby the dechlorination of chlorinated products may be carried out at much lower temperature ranges. For example, as described in the said application, the chlorinated products may be diluted by a hydrocarbon of suitable boiling point, as kerosene, mineral spirits or the like, and the mixture heated to about 160–210° C., preferably in presence of iron or other metal powder serving as a catalyst. Under these conditions the evolution of hydrochloric acid proceeds smoothly and regularly, and the dechlorinated product is quite free from undissolved gummy or asphaltic residues, and is directly applicable to a wide variety of uses, especially in the paint or varnish and plastic and analogous arts.

The present invention relates, in one of its aspects, to the preparation and recovery of substantially pure hydrochloric acid from chlorin, by a process involving chlorination of a mineral oil and the subsequent elimination of combined chlorin therefrom under conditions to avoid substantial contamination of the finished acid by organic or inorganic impurities.

The invention relates, in another of its aspects, to the preparation of relatively light-colored dechlorinated products by a process involving a distillation, preferably carried out under vacuum, of the desired unsaturated bodies; such distillation being carried out at comparatively high temperature but in presence of a liquid or fusible material of decidedly higher boiling point than that of the said unsaturated hydrocarbons.

This high boiling material, which may consist for example of such high boiling gylcerides as soya oil, castor oil, etc.; or of high boiling hydrogenation products from vegetable or animal oils; or of high boiling mineral bodies such as Montan wax or the like; or of fusible resinous materials including ordinary rosin; or in general of any other high boiling substance which is liquid at the distilling temperature, is miscible with or soluble in the dechlorinated oil, and is not subject to substantial decomposition at the distilling point of the latter in vacuo, may be introduced either prior to or subsequent to the dechlorinating step. That is to say it may, when not injuriously affected by hydrochloric acid, serve as the diluent, or a portion of the diluent, for the chlorinated oil during the dechlorinating step; or if preferred it may be added to the dechlorinated oil to serve as a high boiling liquid bath from which the dechlorinated oil may be distilled without undergoing excessive decomposition or polymerization; or it may successively serve both of these purposes.

Following are certain specific illustrative examples in accordance with the invention, it being clearly understood that such examples are in no sense restrictive:

*Example I.*

210 parts by weight of a dechlorinated oil prepared by the chlorination and subsequent dechlorination of a crude Pennsylvania petroleum, were mixed with 140 parts of raw soya oil, and the mixture subjected to distillation under a pressure of 35–45 mm. of mercury. At temperatures up to 270° C. practically all of the dechlorinated oil was recovered as a mobile yellow liquid having drying properties. The distillate so obtained may if desired be washed with water or alkaline solutions to remove any traces of hydrochloric acid which may have been split off during the distillation step; and small percentages of the usual paint driers may be added to the distillate to accelerate the hardening of the film.

*Example II.*

The conditions were as in example I, except that the soya oil was replaced by 145 parts of castor oil.

*Example III.*

To 210 parts of a dechlorinated oil prepared in the described manner from a petroleum distillate boiling approximately between 160–220° C. were added 70 parts of a mineral wax (paraffin wax) boiling above 300° C. in vacuo, and the mixture was distilled under 35–45 mm. pressure at temperatures up to 190° C. A nearly colorless, very mobile oil was obtained, which exhibited drying properties.

*Example IV.*

The high boiling component of the foregoing example was replaced by a hydrogenated whale oil, solid at normal temperatures. The distillation was conducted as above described and the distillate exhibited essentially similar properties.

The residues remaining from the distillation in presence of high boiling glycerides are as a rule, after cooling, hard brittle resinous masses, which are utilizable as varnish components and for many other purposes in the arts.

In all cases the hydrochloric acid evolved during the dechlorinating step may be collected in water in any suitable acid-proof absorbing system, and by the use of pure water (distilled) commercial acid of exceptional purity and color may be prepared. Owing to its manner of preparation and origin it is practically free from such usual contaminants as chlorin, iron, arsenic, sulfuric acid, etc., and owing to the fact that the evolution of the acid occurs at comparatively high temperatures from a high boiling bath, any organic products which may tend to accompany it are readily refluxed back by cooling the effluent gas to normal temperatures or below. Residual traces of organic matter are easily removed from the gaseous acid by a preliminary washing of the gas with concentrated HCl solution, or by such other treatment as circumstances may indicate.

It will of course be understood that hydrochloric acid is also evolved during the first or chlorinating step, and will likewise be absorbed in the same, or preferably in another absorbing system. But this last mentioned portion of the gas is evolved under entirely different conditions, which do not offer the same advantages as regards the preparation of hydrochloric acid of exceptionally high purity. In the first place the evolution of hydrochloric acid in the chlorinating reaction occurs simultaneously with the absorption of chlorin, precisely as in the preparation of any other organic chlorin-substitution compound; and there is always, therefore, a liability to the contamination of the hydrochloric acid by excess or unabsorbed chlorin. In the second place the original oil to be chlorinated is present in diminishing proportion throughout the entire chlorinating reaction, and this may contain greater or less proportions of volatile components which will tend to pass off with and contaminate the hydrochloric acid. In the third place, the tendency to the volatilization of portions of the original hydrocarbon or of the chlorinated product is greatly accentuated when the chlorin employed is diluted by air, as is often the case, such dilution of course corresponding to a decided increase in the total volume of the exit gases.

Accordingly the present invention, in so far as the present application is concerned, is directed primarily to the collection and recovery of the hydrochloric acid evolved during the second or dechlorinating step of the process. The acid evolved during the first or chlorinating step may and as a rule will be collected in similar manner, and may even be collected wholly or in part in the same absorbing system without departing from this invention: but when acid of the highest commercial grade is desired it is advantageous to absorb separately the acid vapors arising during the second operating stage of the process.

I claim:—

1. Process of preparing substantially pure hydrochloric acid from chlorin derivatives of hydrocarbons, comprising mixing a high-boiling chlorinated hydrocarbon with a non-chlorinated material of higher boiling point which is liquid at the temperature employed, and subjecting the mixture to a sufficient temperature below its boiling point to eliminate the combined chlorin as hydrochloric acid, and collecting the hydrochloric acid thereby evolved.

2. Process of preparing substantially pure hydrochloric acid from chlorin derivates of hydrocarbons, comprising mixing a high-boiling chlorinated hydrocarbon with a non-chlorinated fusible resinous material of higher boiling point, and subjecting the mixture to a sufficient temperature below its boiling point to eliminate the combined chlorin as hydrochloric acid, and collecting the hydrochloric acid thereby evolved.

3. In a process of preparing unsaturated products from chlorinated hydrocarbons, the steps comprising mixing a high-boiling chlorinated hydrocarbon with a non-chlorinated material of higher boiling point which is liquid at the temperature employed, and subjecting the mixture to a sufficient temperature below its boiling point to eliminate the combined chlorin as hydrochloric acid, and thereafter fractioning off the unsaturated hydrocarbon in presence of the higher boiling component.

4. In a process of preparing unsaturated products from chlorinated hydrocarbons, the step which consists in distilling the unsaturated hydrocarbon from a liquid bath containing an added higher boiling component.

5. In a process of preparing unsaturated products from chlorinated hydrocarbons, the step which consists in distilling the unsaturated hydrocarbon in vacuo from a liquid bath containing an added higher boiling component.

In testimony whereof, I affix my signature.

HENRY A. GARDNER.